July 26, 1927.
H. KOEPP
1,637,002
SPACING ARRANGEMENT OF BEE FRAMES
Filed Nov. 12, 1923
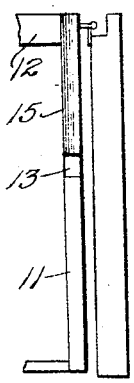
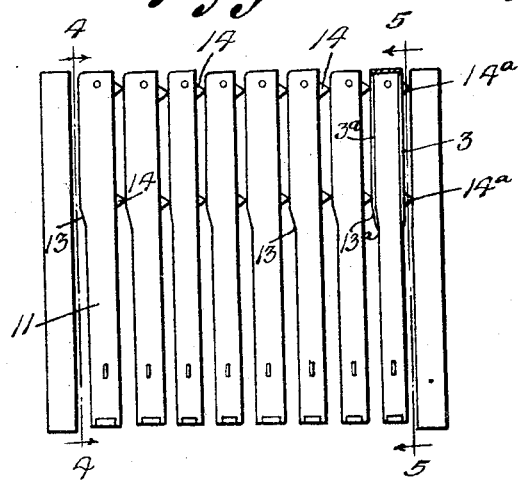
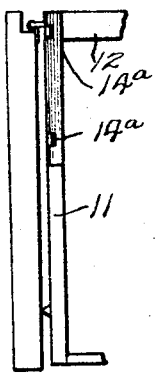
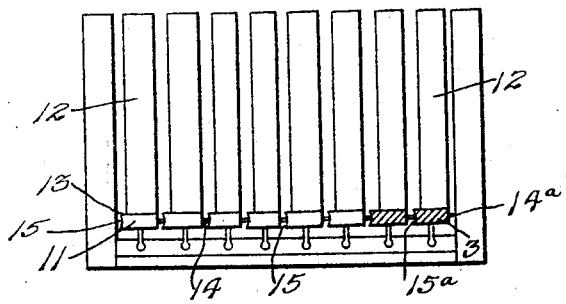
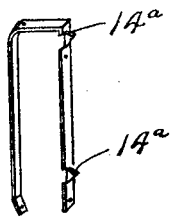
Inventor
Herman Koepp Patented July 26, 1927.

1,637,002

UNITED STATES PATENT OFFICE.

HERMAN KOEPP, OF WALLOWA, OREGON.

SPACING ARRANGEMENT OF BEE FRAMES.

Application filed November 12, 1923. Serial No. 674,354.

As is known to those skilled in the art, bees will tolerate no space in the hive too small for a passageway; smaller spaces are sealed up with propolis. For this reason all truly self-spacing frames in use are "stuck" and must be broken loose before handling. The loosening of frames is tiresome and causes great loss of time and incites the bees to attack the operator.

The object of this invention is to provide bee frames in strict compliance with the bee space law for avoiding the troublesome factors and hindrances met with in handling bees in frames.

The object and the advantages have been accomplished by the invention of a new spacing arrangement hereinafter described.

The accompanying drawings give a definite idea of the invention, which may be modified, however, within the scope of the claims pointed out at the conclusion of this description.

In the accompanying drawings:

Figure 1 is a front elevation of a hive body cut open showing the new frames inside;

Figure 2 is a horizontal view of part of the open hive showing the new frames inside;

Figure 3 is a detailed view in perspective of a frame-reinforcing, self-spacing sheet metal band (enlarged);

Figure 4 is a transverse sectional view on the line 4 4, Fig. 1;

Figure 5 is a transverse sectional view on the line 5 5, Fig. 1.

Similar numerals refer to similar parts throughout the several views.

Referring to Fig. 1 it will be seen that both end bars 11, 11 of each frame are reduced in width along one lower side edge, while the other side edge forms a straight line. The width of the lower ends of the end bars should equal the width of the top bar 12 and correspond with the average thickness of honeycomb filling the frames. The width of the upper ends of the end bars is governed by the spacing distance of frames decided on; it being imperative that a full bee space is provided between the upper side edges of the end bars of juxtaposed frames. It is evident that the wide part of each upper end bar will form a projecting cheek 13, 13 on one side. From the opposite upper side edge of each end bar two preferably V-shaped staples 14 14 or suitable means are projected to a bee space width; the slightly rounded curves of said staples or suitable means engage the surface of the projecting cheek of the juxtaposed frame, and thus a safe bee space is provided between juxtaposed frames.

The surface edge of each projecting cheek 13, 13, on which the staples 14 14 or suitable means of the juxtaposed frame rest or slide, may be straight; but if said edge is provided with a slightly concave groove 15, 15 extending over the entire length of each cheek, the staples or suitable means will be less apt to slide off the surface either on the inside or on the outside.

The new spacing arrangement as described is a simple satisfactory solution of the old problem how to provide practical sidewise spacing frames; but the beekeeper moving over very rough roads may require a reinforced form of construction which is shown at 3, Fig. 1. The reinforcing sheet metal band Fig. 3 reinforces the wooden end bars along their upper edges and over the top and prevents said end bars from splitting and tearing up while frames are used roughly. The reinforced projecting cheeks 13ª, 13ª are provided with grooves 15ª, 15ª; said grooves engage the preferably V-shaped metal projections 14ª 14ª of juxtaposed frames. Thus the reinforced form of construction is spaced in exactly the same manner as the general form of construction described previously.

In order to make both forms of construction nearly ideal they must be universally interchangeable and reversible. This is accomplished by having the like edges of both end bars on the opposite sides of the frame.

I am aware that prior to my invention self-spacing frames have been constructed, that sidewise spacing wood cheeks along both upper edges of both end bars of the frame as well as improved metal spacers have been in use, and that staples projected from various points near the two farthest opposite upper corners of the frame have been tried. I, therefore, do not claim said means per se; but

I claim:

1. A bee frame having end bars, each bar being cut away at its lower part on one edge to reduce its width to the thickness of honeycomb, the un-reduced portion of the bar providing a cheek, and means projected from the opposite edge at its upper part for spacing one frame from another frame.

2. A bee frame having end bars, each bar being cut away at its lower part on one edge to reduce its width to the thickness of honeycomb, the un-reduced portion of the bar providing a cheek, and metal reinforcing means for the upper part of the bar, said means having portions projecting laterally for spacing the upper edges of the bars of juxtaposed frames from each other.

3. A bee frame having end bars, each bar being cut away at its lower part on one edge to reduce its width to the thickness of honeycomb, the un-reduced portion of the bar providing a cheek, and a groove along the edge of said cheek, and means on the opposite edge at its upper part, said means being adapted to engage the groove of the cheek of the end bar of the juxtaposed frame for spacing the frames apart and for preventing disengagement of the frames from their normal position.

In testimony whereof I hereunto affix my signature.

HERMAN KOEPP.